(12) United States Patent
Oguri et al.

(10) Patent No.: US 12,403,854 B2
(45) Date of Patent: Sep. 2, 2025

(54) VEHICLE BODY REAR STRUCTURE

(71) Applicant: HONDA MOTOR CO., LTD., Tokyo (JP)

(72) Inventors: Masayuki Oguri, Tokyo (JP); Norikazu Matsuura, Tokyo (JP); Ukyo Watanabe, Tokyo (JP); Shunta Suzuki, Tokyo (JP); Yoshinori Gemba, Tokyo (JP); Ren Suzuki, Haga-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 397 days.

(21) Appl. No.: 18/125,766

(22) Filed: Mar. 24, 2023

(65) Prior Publication Data
US 2023/0311798 A1 Oct. 5, 2023

(30) Foreign Application Priority Data

Mar. 31, 2022 (JP) ................. 2022-058138

(51) Int. Cl.
B62D 21/15 (2006.01)
B60R 19/34 (2006.01)
B62D 25/08 (2006.01)
B62D 25/20 (2006.01)
B60R 19/18 (2006.01)

(52) U.S. Cl.
CPC .......... B60R 19/34 (2013.01); B62D 21/152 (2013.01); B60R 2019/1806 (2013.01); B62D 21/155 (2013.01); B62D 25/087 (2013.01); B62D 25/2027 (2013.01)

(58) Field of Classification Search
CPC .... B62D 21/152; B62D 21/155; B62D 25/08; B62D 25/087; B62D 25/20; B62D 25/2027

USPC ................. 296/187.11, 193.08, 203.04
See application file for complete search history.

(56) References Cited

U.S. PATENT DOCUMENTS

| | | | | |
|---|---|---|---|---|
| 2011/0215617 A1* | 9/2011 | Izutsu | ............... | B62D 21/152 296/203.04 |
| 2013/0249243 A1* | 9/2013 | Lee | ................. | B62D 25/082 296/187.11 |
| 2017/0183037 A1* | 6/2017 | Kato | ............... | B62D 25/2027 |
| 2020/0172167 A1* | 6/2020 | Watanabe | ............. | B62D 21/155 |
| 2020/0406734 A1* | 12/2020 | Choi | .................. | B60K 1/04 |
| 2022/0258808 A1* | 8/2022 | Chino | ............... | B62D 25/08 |
| 2022/0289297 A1* | 9/2022 | Watanabe | ............. | B62D 25/2027 |
| 2023/0311798 A1* | 10/2023 | Oguri | ................ | B60R 19/34 293/132 |

FOREIGN PATENT DOCUMENTS

JP 2009-067376 4/2009

* cited by examiner

Primary Examiner — Gregory A Blankenship
(74) Attorney, Agent, or Firm — Amin, Turocy & Watson, LLP

(57) ABSTRACT

A vehicle body rear structure includes a floor pan 13, a subframe, an impact absorbing member 4 provided behind the subframe, a bracket 5 for detachably attaching the impact absorbing member 4, and an extension member 6 provided to face a rear end portion 39 of the impact absorbing member 4. The impact absorbing member 4 has a first extending portion 47 along a lower surface 13a of the floor pan 13 and a second extending portion 48 that extends forward with respect to the floor pan 13. The extension member 6 extends above the impact absorbing member 4 in the vertical direction.

8 Claims, 7 Drawing Sheets

VEHICLE BODY REAR STRUCTURE

CROSS-REFERENCE TO RELATED APPLICATION

Priority is claimed on Japanese Patent Application No. 2022-058138, filed Mar. 31, 2022, the content of which is incorporated herein by reference.

BACKGROUND OF THE INVENTION

Field of the Invention

The present invention relates to a vehicle body rear structure.

Description of Related Art

In recent years, efforts to provide access to sustainable transportation systems that consider vulnerable people such as the elderly and children among transportation participants have intensified. In order to achieve this, research and development are focusing on further improving the safety and convenience of traffic through the development of vehicle body rigidity. Furthermore, in the related art, a vehicle body rear structure in which various in-vehicle parts are mounted in the vicinity of a floor panel in a rear portion of a vehicle is known. In such a vehicle, various technologies are proposed for improving the safety of an occupant by absorbing an impact load at the time of a rear collision while protecting in-vehicle parts.

For example, Patent Document 1 (Japanese Unexamined Patent Application, First Publication No. 2009-67376) discloses a vehicle body rear structure that has a torsion beam disposed behind a side sill, a floor pan protruding downward, and a rear center frame (an impact absorbing member) extending in a front-rear direction along a lower surface of the floor pan. The rear center frame is disposed behind the torsion beam.

According to the technology described in Patent Document 1, in an initial stage of a rear collision, an impact load is absorbed by a rear portion of the rear center frame formed in an uneven shape being crushed. In a later stage of the rear collision, the impact load is absorbed by the rear center frame coming into contact with the torsion beam. Therefore, the impact load can be absorbed in a short stroke and the safety of the occupant can be ensured.

SUMMARY OF THE INVENTION

Incidentally, a vehicle that travels using a gas fuel such as hydrogen gas as a fuel is known as a vehicle that requires vehicle body rigidity. In such a vehicle, a floor panel may be raised upward and a fuel tank may be disposed in this raised portion. In this case, an opening of the floor panel is formed below the fuel tank. For this reason, the impact absorbing member cannot be disposed along the lower surface of the floor panel in a portion corresponding to the fuel tank in the front-rear direction. As a result, a spacing between a member such as the torsion beam that receives a load and the impact absorbing member becomes large, and thus the impact absorbing member becomes idle at the time of a rear collision and may not be able to sufficiently absorb the impact.

In order to solve these problems, a structure in which, for example, an impact absorbing member is disposed on the lower surface of the floor panel in the front-rear direction, and the impact absorbing member extends forward, and thus the front end portion of the impact absorbing member and a vehicle body frame are disposed close to each other is conceivable. As a result, the impact absorbing member and the vehicle body frame can be reliably brought into contact with each other at the time of a rear collision, and the impact load at the time of the rear collision can be absorbed by the impact absorbing member.

However, in the above-described configuration, for example, when the impact absorbing member is disposed at a low position, the amount of overlap in a vertical direction of the impact absorbing member with a contact object positioned behind the impact absorbing member in the vehicle may be small. In this case, there is a possibility of the impact absorbing member and the contact object not coming into contact with each other due to the positional deviation, in which case a sufficient shock absorbing effect caused by bringing the impact absorbing member and the contact object into contact with each other cannot be obtained. That is, in the prior art, there is room for improvement in terms of further enhancing the impact absorbing effect of the impact absorbing member and further enhancing the safety of the occupant.

Accordingly, the present invention is made to solve the above-described problems in the prior art, and an object of the present invention is to provide a vehicle body rear structure that can further improve an impact absorbing effect of an impact absorbing member and further improve the safety of the occupant. Furthermore, the object of the present invention is to contribute to the development of sustainable transportation systems.

In order to solve the above problems, a vehicle body rear structure according to the present invention has the following configurations.

(1) According to an aspect of the present invention, there is provided a vehicle body rear structure including: a floor panel; a subframe which is provided below the floor panel in a vertical direction of a vehicle body; an impact absorbing member which is provided behind the subframe in a front-rear direction of the vehicle body and extends in the front-rear direction; a bracket which detachably attaches the impact absorbing member to a lower surface of the floor panel; and an extension member which is provided to face a rear end portion of the impact absorbing member, wherein the floor panel has a floor pan having the lower surface to which the impact absorbing member is attached, wherein the impact absorbing member has a first extending portion which is provided along the lower surface of the floor pan, and a second extending portion which is integrally formed with the first extending portion and extends forward with respect to the floor pan in the front-rear direction, wherein a front end portion of the impact absorbing member is disposed to be at the same height as the subframe in the vertical direction and is disposed with a spacing from the subframe in the front-rear direction, and wherein the extension member extends above the impact absorbing member in the vertical direction.

(2) In the vehicle body rear structure according to the aspect of (1), the extension member may be fixed to the bracket in the front-rear direction and may be fixed to the floor pan in the vertical direction.

(3) In the vehicle body rear structure according to the aspect of (1) or (2), the impact absorbing member may be fixed to the bracket by at least two fixing portions of a front fixing portion provided relatively forward and a rear fixing portion provided rearward with respect to the front fixing portion, and the front fixing portion and the rear fixing portion may be provided in the single bracket.

(4) The vehicle body rear structure according to the aspect of (1) or (2) may further include: a pair of left and right rear frames; a rear bumper beam; and a reinforcing member which is provided to connect the pair of rear frames to each other behind the rear bumper beam, wherein the reinforcing member may be fixed to the rear bumper beam by being fastened together with the rear bumper beam.

(5) In the vehicle body rear structure according to the aspect of (4), the reinforcing member may extend in a horizontal direction of the vehicle body in a state where it is attached to the vehicle body and may have a bead extending in the horizontal direction.

According to the aspect of (1), the impact absorbing member is detachably attached to the lower surface of the floor pan located at the rear portion of the floor panel via the bracket. The impact absorbing member has the first extending portion along the floor panel (the floor pan) and the second extending portion that extends forward with respect to the floor pan. As a result, the front end portion of the impact absorbing member can be disposed in front of the floor pan. Therefore, for example, even in a case where the fuel tank or the like is disposed below the floor panel, the impact absorbing member can be extended forward to a desired position in the front-rear direction.

The subframe is disposed in front of the impact absorbing member. The front end portion of the impact absorbing member is disposed to be at the same height as the subframe in the vertical direction and is disposed with the spacing from the subframe in the front-rear direction. As a result, even in a case where the floor panel has the opening on the lower surface thereof, it is possible to dispose the subframe and the front end portion of the impact absorbing member close to each other as compared with the related art in which the impact absorbing member is disposed along the floor panel. Therefore, it is possible to prevent the impact absorbing member from becoming idle at the time of a rear collision and effectively absorb the impact load at the time of a rear collision.

Since the impact absorbing member is brought into contact with the subframe, it is possible to prevent the height positions of the impact absorbing member and the subframe from deviating from each other during a rear collision. That is, as compared with the related art in which the impact absorbing member is brought into contact with a torsion beam which is easily displaced in the vertical direction with respect to the vehicle body due to a relationship with a suspension, the subframe is fixed to the vehicle body, and thus a deviation in a relative position between the impact absorbing member also attached to the vehicle body and the subframe is less likely to occur. As a result, the impact absorbing member and the subframe can be reliably brought into contact with each other at the time of a rear collision.

Furthermore, the extension member is provided to face the rear end portion of the impact absorbing member. As a result, for example, in a case where the contact object is positioned behind the impact absorbing member, it is possible to bring the impact absorbing member and the contact object into contact with each other via the extension member. At this time, since the extension member extends above the impact absorbing member, the amount of overlap (the lap amount) between the extension member and the contact object in the vertical direction increases. As a result, regardless of the vertical position of the contact object, it is possible to transmit the load to the impact absorbing member and to absorb the impact. Therefore, it is possible to enhance an impact absorbing effect of the impact absorbing member and the contact object.

Therefore, it is possible to provide the vehicle body rear structure that can further improve the impact absorbing effect of the impact absorbing member and further improve the safety of the occupant.

According to the aspect of (2), the extension member is fixed to the bracket and the floor pan in the front-rear direction and the vertical direction, respectively. Since the extension member is fixed to two members in two directions, it is possible to increase the fixing strength of the extension member. Therefore, it is possible to stably secure the lap amount between the impact absorbing member and the contact object in the vertical direction. The extension member is not fixed to the impact absorbing member. For this reason, there is no need to form a flange or the like for attaching the extension member to the impact absorbing member, and it is possible to form the impact absorbing member through extrusion molding. Furthermore, since the extension member and the impact absorbing member are not directly fixed to each other, it is possible to effectively transmit the impact load without being affected by the deformation of the impact absorbing member at the time of a rear collision.

According to the aspect of (3), the impact absorbing member is fixed to the bracket at at least two positions of the front fixing portion and the rear fixing portion, and the front fixing portion and the rear fixing portion are provided for one bracket. Since the lower surface of the floor pan is reinforced by the firmly fixed bracket, the rigidity of the floor pan increases. As a result, the attachment strength of the impact absorbing member is also improved. Therefore, when the load is transmitted to the extension member, it is possible to reliably transmit the impact load to the impact absorbing member.

According to the aspect of (4), the reinforcing member is provided to connect the pair of rear frames to each other behind the rear bumper beam and is fastened together with the rear bumper beam. As a result, it is possible to curb the breakage of the rear bumper beam at the time of a rear collision, and it is possible to transmit the impact load between the rear frames. Therefore, it is possible to further improve the impact absorption effect of the vehicle as a whole, and it is possible to further improve the safety of the occupant.

According to the aspect of (5), the reinforcing member extends in the horizontal direction of the vehicle body and has the bead extending in the horizontal direction. By forming the bead, it is possible to improve the strength of the reinforcing member, which is elongated in the horizontal direction (that is, the vehicle width direction), and it is possible to curb the generation of distortion during manufacturing of the reinforcing member, for example. Since both the reinforcing member and the bead extend in the horizontal direction, it is possible to curb stress concentration compared to the case where the reinforcing member and the bead are curved in the vertical direction, such as in a U shape when viewed in the front-rear direction. Therefore, it is possible to curb the deformation and breakage of the reinforcing member, and it is possible to enhance the efficiency of transmitting the impact load between the rear frames at the time of a rear collision. Therefore, it is possible to further improve the impact absorption effect of the vehicle as a whole, and it is possible to further improve the safety of the occupant.

DETAILED DESCRIPTION OF THE INVENTION

Hereinafter, an embodiment of the present invention will be described with reference to the drawings. In the following description, a front-rear direction, a left-right direction, and a vertical direction coincide with a front-rear direction, a left-right direction, and a vertical direction of a vehicle body 11 having a vehicle body rear structure 1. The left-right direction may be referred to as a vehicle width direction. In the figure, an arrow FR indicates forward with respect to a vehicle body, an arrow UP indicates upward with respect to the vehicle body, and an arrow LH indicates leftward with respect to the vehicle body.

(Vehicle Body Rear Structure)

Figure 1:
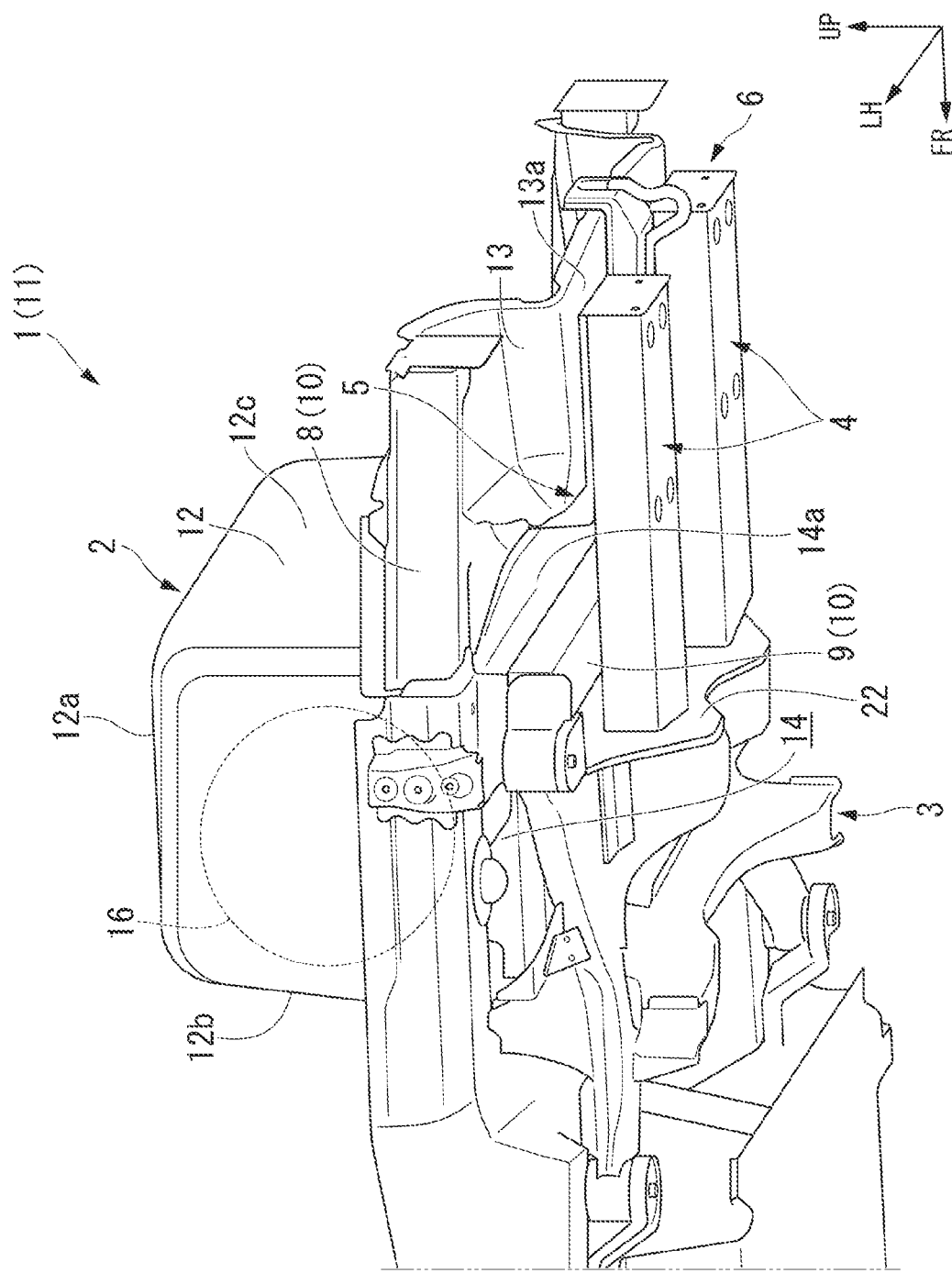
FIG. 1 is a perspective view of a vehicle body rear structure according to an embodiment.
Figure 2:
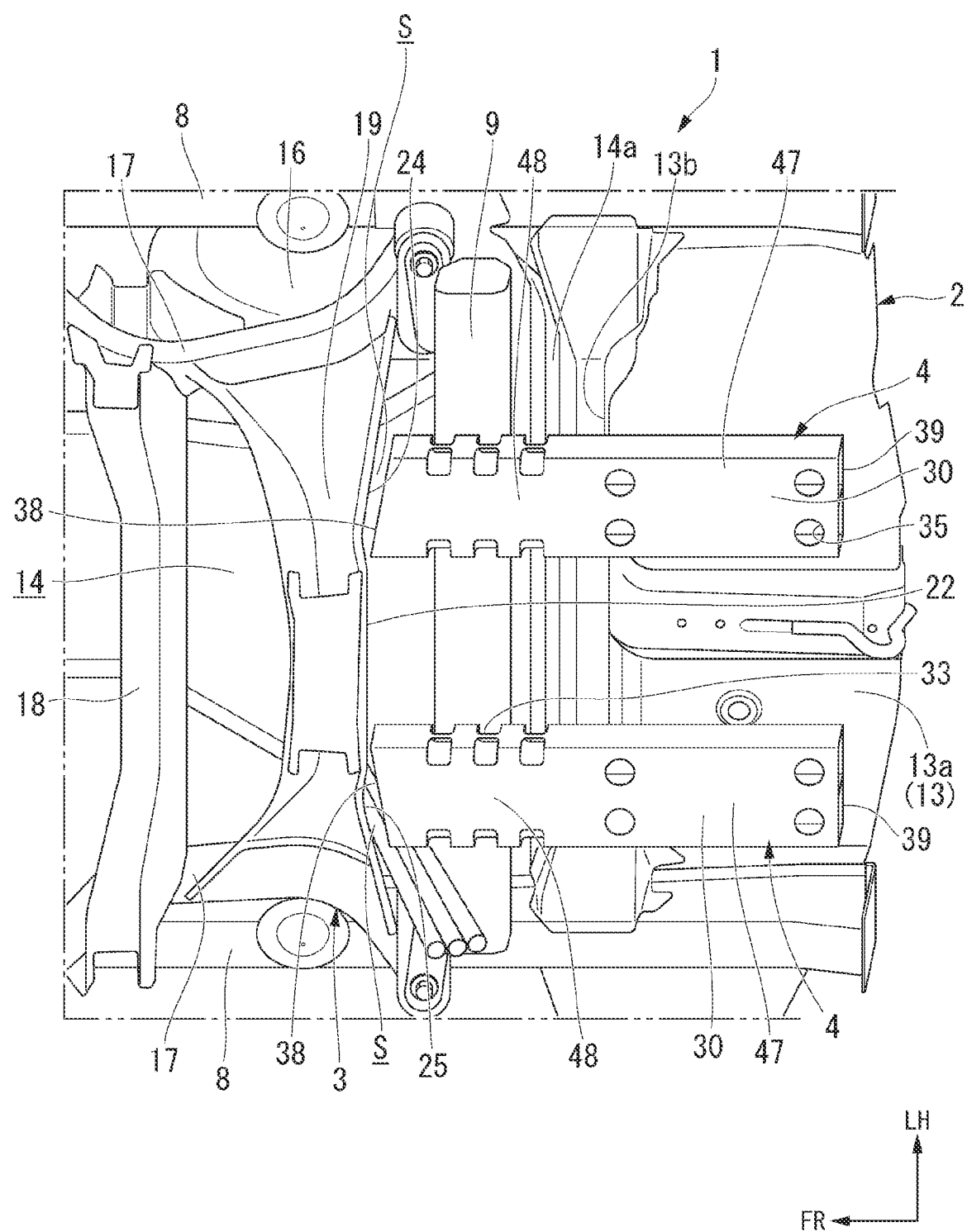
FIG. 2 is a perspective view of the vehicle body rear structure according to the embodiment from below.

FIG. 1 is a perspective view of the vehicle body rear structure 1 according to the embodiment. FIG. 2 is a perspective view of the vehicle body rear structure 1 according to the embodiment from below.

As shown in FIGS. 1 and 2, the vehicle body rear structure 1 is provided at a rear portion of the vehicle body 11 of an automobile or the like. The vehicle body 11 is, for example, a vehicle body of a natural gas vehicle that travels using a gas fuel such as natural gas or hydrogen gas as fuel, a fuel cell vehicle that travels using electric power generated by a fuel gas, or the like. The vehicle body rear structure 1 of the present embodiment is a rear structure for protecting an occupant by absorbing an impact load in the front-rear direction in the vehicle body 11 in which a fuel tank 16 filled with a gas fuel is mounted under a floor.

The vehicle body rear structure 1 of the present embodiment is applied to a vehicle body in which, for example, a passenger compartment that an occupant enters and a luggage compartment located behind the passenger compartment (neither is shown) are continuous (for example, a one-box car or the like). In other words, the vehicle body rear structure 1 of the present embodiment is applied to a vehicle body in which there is no distinction between the passenger compartment and the luggage compartment and the rigidity of a floor rear portion is guaranteed by the floor alone. The vehicle body rear structure 1 includes a vehicle body frame 10, a floor panel 2, a subframe 3, a bracket 5, an impact absorbing member 4, an extension member 6, and a reinforcing member 7 (see FIG. 8).

(Vehicle Body Frame)

The vehicle body frame 10 is a member constituting a frame of the vehicle body. The vehicle body frame 10 has a side sill 8, a cross member 9, a rear frame 55 (see FIG. 8), a rear bumper beam 57 (see FIG. 8), and a rear panel 58 (see FIG. 8).

A pair of side sills 8 are provided on left and right sides to be separated from each other in the vehicle width direction. The pair of side sills 8 each extend in the front-rear direction of the vehicle. The cross member 9 extends in the vehicle width direction between the pair of side sills 8. A plurality of cross members 9 are provided to be separated from each other in the front-rear direction. In the present embodiment, the cross members 9 are each provided in front of and behind a recess 12 of the floor panel 2, which will be described in detail later.

The rear frame 55, the rear bumper beam 57, and the rear panel 58 (see FIG. 8 for all) will be described later.

(Floor Panel)

The floor panel 2 is provided at a lower portion of the vehicle body and constitutes a floor surface of the passenger compartment. The floor panel 2 is provided between the pair of left and right side sills 8. Both end portions of the floor panel 2 in the vehicle width direction are fixed to the side sills 8. The floor panel 2 is provided above the cross member 9.

As shown in FIG. 1, the floor panel 2 has a recess 12 and a floor pan 13.

The recess 12 is formed to be recessed upward when seen from the lateral side by being curved such that a panel member constituting the floor panel 2 is raised upward. The recess 12 is formed to open downward. In other words, a lower surface of the floor panel 2 has an opening 14. The recess 12 is provided at a position between the passenger compartment and the luggage compartment in the front-rear direction. The recess 12 is formed in a rectangular shape having an upper wall 12a, a front wall 12b, and a rear wall 12c in a side view seen in the vehicle width direction. The fuel tank 16 is accommodated below the floor panel 2 and inside the recess 12.

The floor pan 13 constitutes a rear portion of the floor panel 2. The floor pan 13 is provided behind the recess 12. The floor pan 13 is formed to bulge downward as compared with a front portion of the floor panel 2 having the recess 12. In other words, a lower surface 13a of the floor pan 13 is located below the opening 14 (an opening surface) of the recess 12. The lower surface 13a of the floor pan 13 is formed in a plane shape substantially parallel to a horizontal direction.

In the following description, a rear edge portion of the opening 14 of the recess 12 may be referred to as an opening rear edge 14a. The opening rear edge 14a is located at a position corresponding to the rear wall 12c of the recess 12 in the front-rear direction.

(Subframe)

As shown in FIGS. 1 and 2, the subframe 3 is provided below the floor panel 2 and the fuel tank 16. The subframe 3 is provided at a position corresponding to the opening 14 of the floor panel 2 when seen in the vertical direction. The subframe 3 covers the opening 14 of the floor panel 2 from below. The subframe 3 has a pair of arms 17, a front beam 18, a rear beam 19, and a contacted surface 22. The pair of arms 17, the front beam 18, the rear beam 19, and the contacted surface 22 are integrally formed with each other.

As shown in FIG. 2, the pair of arms 17 are provided on left and right sides. The arms 17 extend in the front-rear direction. Each of the pair of arms 17 is gently curved such that a central portion in the front-rear direction is located inside in the vehicle width direction with respect to a front end portion and a rear end portion. The front end portion and the rear end portion of each of the pair of arms 17 are fixed to the vehicle body frame 10. In the present embodiment, the front end portion and the rear end portion of each arm 17 are attached to the side sill 8 via a connecting bracket (not shown). As a result, the subframe 3 is fixed to the vehicle body frame 10.

The front beam 18 is provided between the pair of arms 17. The front beam 18 extends in the vehicle width direction. Each of left and right end portions of the front beam 18 is connected to one of the pair of arms 17. The front beam 18 is formed in a U shape that opens upward in a cross-sectional view orthogonal to a longitudinal direction thereof. The front beam 18 may be formed in a frame shape having a closed cross section, for example.

The rear beam 19 is provided between the pair of arms 17. The rear beam 19 is provided at a distance rearward from the front beam 18. The rear beam 19 extends in the vehicle width direction. Each of left and right end portions of the rear beam 19 is connected to one of the pair of arms 17. The rear beam 19 is formed in a plate shape with the vertical direction as a thickness direction. When seen in the vertical direction, a front side of the rear beam 19 is inclined to be located from the rear to the front as it goes from the inside to the outside in the vehicle width direction. Therefore, a width dimension of the rear beam 19 in the front-rear direction increases from the inside to the outside in the vehicle width direction.

The contacted surface 22 (see also FIG. 1) is provided at a rear end portion of the rear beam 19. The contacted surface 22 is formed in a plate shape having the front-rear direction as a direction perpendicular to a surface. The contacted surface 22 is formed by, for example, bending the rear end portion of the rear beam 19 in the vertical direction. The contacted surface 22 is provided over the entire rear side of the rear beam 19 in a longitudinal direction thereof. When seen in the vertical direction, the contacted surface 22 has a portion inclined to be located from the front to the rear as it goes from the inside to the outside in the vehicle width direction. Specifically, in the present embodiment, the contacted surface 22 has a first inclined surface 24 and a second inclined surface 25.

The first inclined surface 24 is provided on a left side of the contacted surface 22 with respect to a central portion in the vehicle width direction. The first inclined surface 24 is inclined to be located from the front to the rear as it goes from the inside (the central portion) to the outside (the left side) in the vehicle width direction.

The second inclined surface 25 is provided on a right side of the contacted surface 22 with respect to a central portion in the vehicle width direction. The second inclined surface 25 is inclined to be located from the front to the rear as it goes from the inside (the central portion) to the outside (the right side) in the vehicle width direction.

A portion of the contacted surface 22 between the first inclined surface 24 and the second inclined surface 25 is provided with a surface substantially parallel to the vehicle width direction. An inner end portion of the first inclined surface 24 in the vehicle width direction and an inner end portion of the second inclined surface 25 in the vehicle width direction may be continuously provided.

(Bracket)

Figure 3:
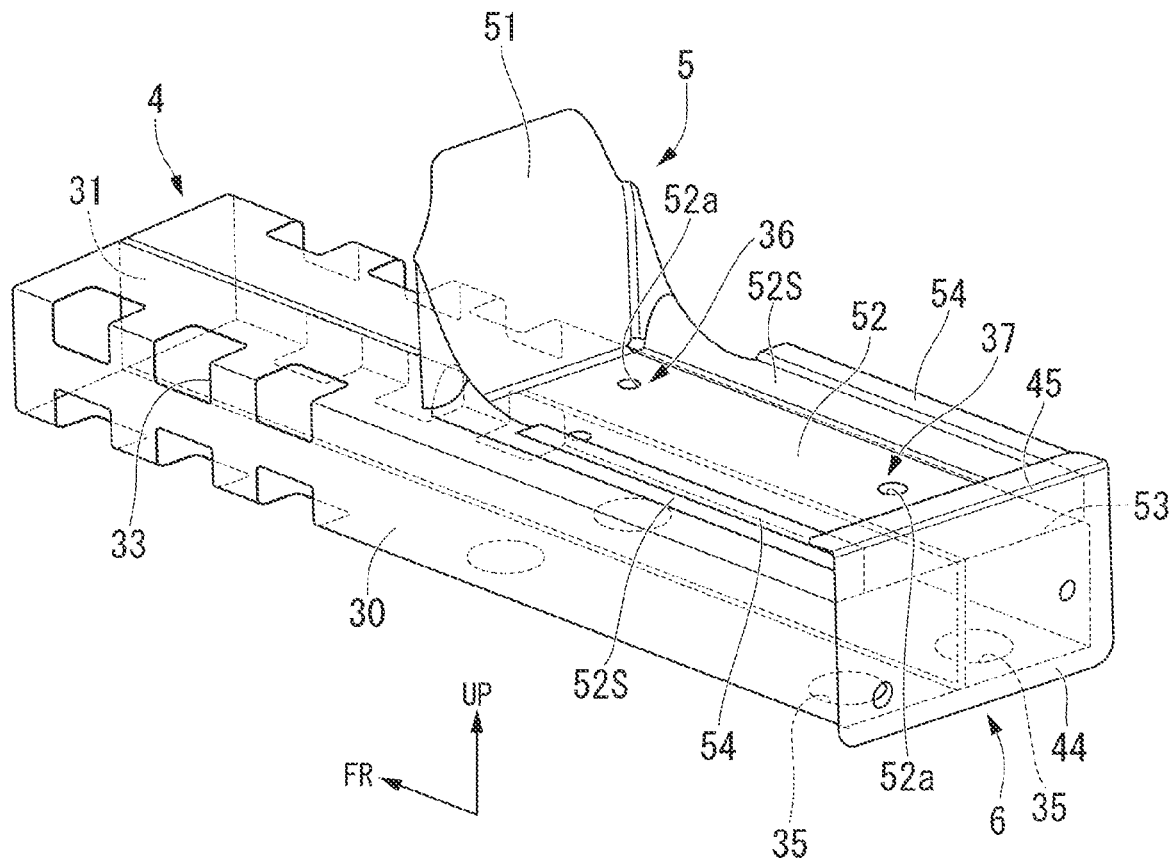
FIG. 3 is an enlarged perspective view of an impact absorbing member, a bracket, and an extension member according to the embodiment.
Figure 4:
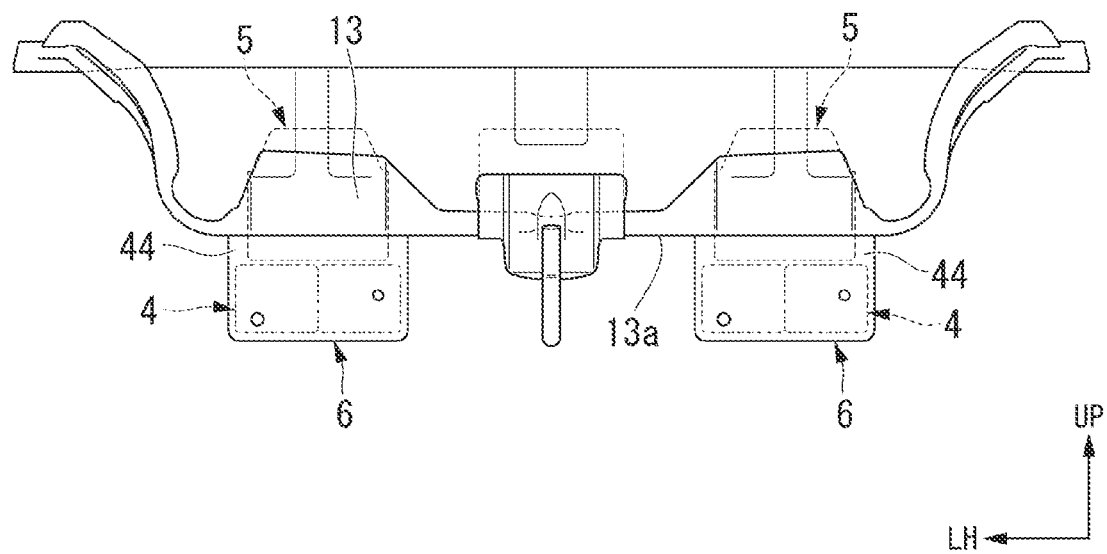
FIG. 4 is a side view of the vehicle body rear structure according to the embodiment from the rear.
Figure 5:
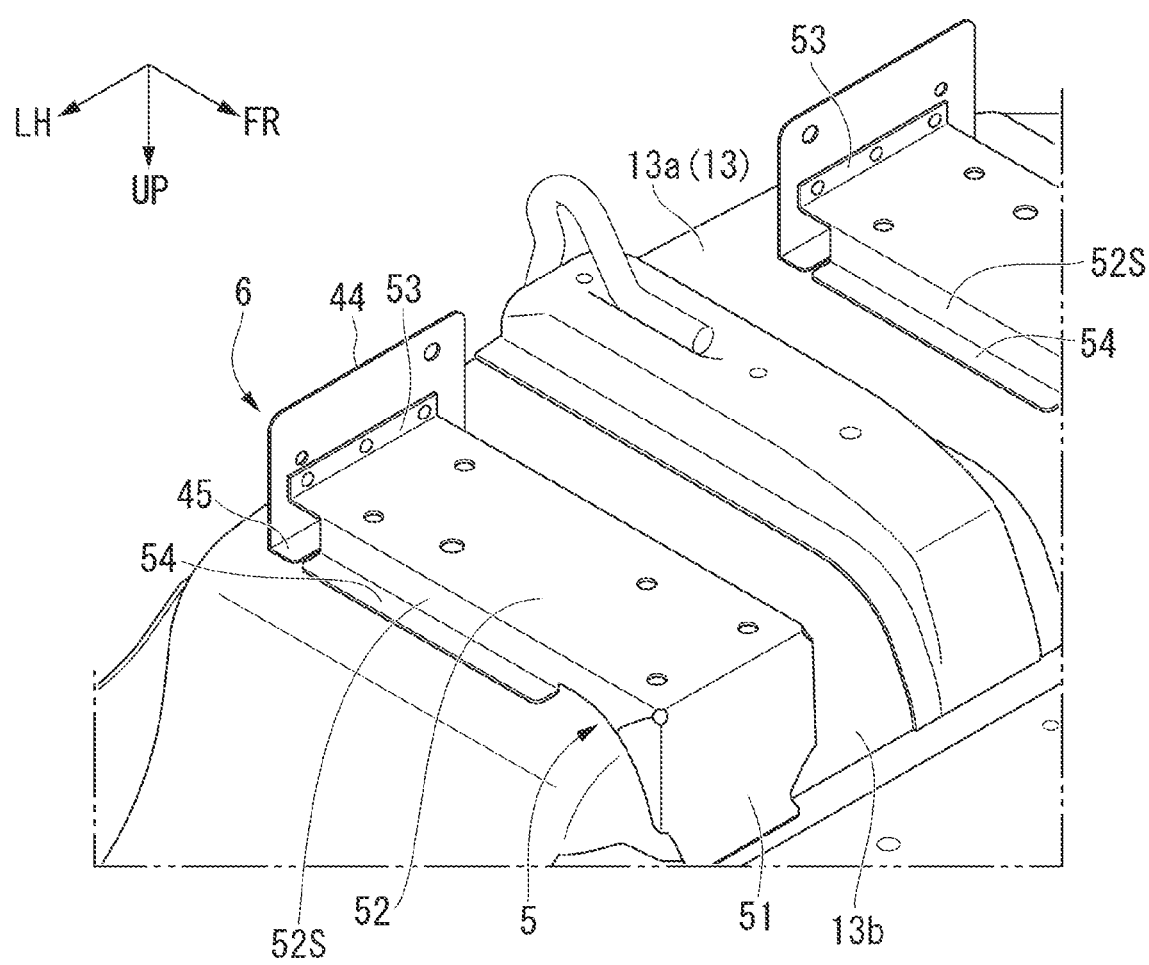
FIG. 5 is a perspective view showing an attachment aspect of the extension member according to the embodiment.
Figure 6:
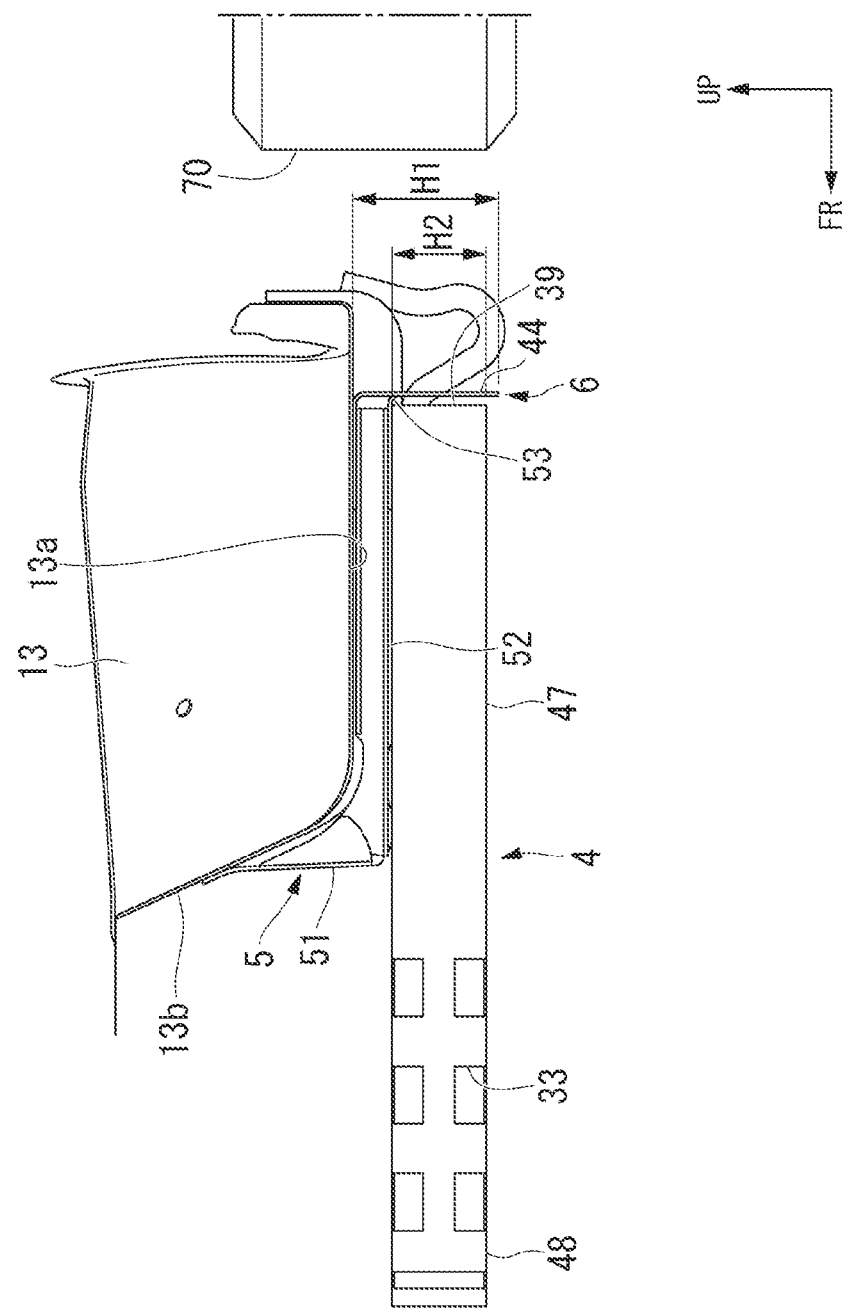
FIG. 6 is a side view of the vehicle body rear structure according to the embodiment from the left.

FIG. 3 is an enlarged perspective view of the impact absorbing member 4, the bracket 5, and an extension member 6 according to the embodiment. FIG. 4 is a side view of the vehicle body rear structure 1 according to the embodiment from the rear. FIG. 5 is a perspective view showing an attachment aspect of the extension member 6 according to the embodiment. FIG. 6 is a side view of the vehicle body rear structure 1 according to the embodiment from the left.

As shown in FIGS. 3 to 6, the bracket 5 is provided on the lower surface of the floor panel 2. The bracket 5 detachably attaches the impact absorbing member 4 to the lower surface 13*a* of the floor panel 2 (the floor pan 13). As shown in FIGS. 5 and 6, the bracket 5 is formed in an L shape extending from a front surface 13*b* of the floor pan 13 to the rear end portion thereof along the lower surface 13*a*. A pair of brackets 5 are provided on the left and right sides. Since the pair of brackets 5 have the same configuration, a left bracket 5 will be described in detail in the following description, and the description of overlapping portions of a right bracket 5 may be omitted.

The bracket 5 is formed in an L shape by a front wall portion 51 extending in the vertical direction along the front surface 13*b* of the floor pan 13 and a horizontal portion 52 extending rearward from a lower end portion of the front wall portion 51. The horizontal portion 52 is spaced downward from the lower surface 13*a* of the floor pan 13 and extends substantially parallel to the lower surface 13*a* of the floor pan 13.

As shown in FIGS. 3 and 5, a rear flange 53 and side flanges 54 are formed at a rear end portion of the horizontal portion 52 of the bracket 5 and both end portions thereof in the vehicle width direction, respectively. The rear flange 53 extends downward from the rear end portion of the horizontal portion 52 of the bracket 5. The rear flange 53 functions as a fixing portion for attaching the extension member 6, which will be described later in detail, to the bracket 5. The side flanges 54 are connected to the horizontal portion 52 via side wall portions 52*s*. The side wall portions 52*s* extend upward from both end portions of the horizontal portion 52 of the bracket 5 in the vehicle width direction. The side flanges 54 extend outward in the vehicle width direction from the upper end portions of the side wall portions 52*s*, that is, in a direction away from the horizontal portion 52. When the side flanges 54 of the bracket 5 and the lower surface 13*a* of the floor pan 13 are joined to each other, the bracket 5 is attached to the floor pan 13.

(Impact Absorbing Member)

As shown in FIGS. 1 to 6, the impact absorbing member 4 is attached to the lower surface 13*a* of the floor pan 13 via the bracket 5. The impact absorbing member 4 is provided behind the subframe 3 in the front-rear direction. A pair of impact absorbing members 4 are provided on left and right sides to be side by side with each other in the vehicle width direction. Since the pair of impact absorbing members 4 are formed bisymmetrically, a left impact absorbing member 4 will be described in detail in the following description, and the description of overlapping portions of a right impact absorbing member 4 may be omitted.

As shown in FIG. 2, the impact absorbing member 4 extends in the front-rear direction to straddle the opening rear edge 14*a* of the recess 12 in the floor panel 2. A rear portion of the impact absorbing member 4 located behind the opening rear edge 14*a* is a first extending portion 47. The first extending portion 47 is provided along the lower surface 13*a* of the floor pan 13. A front portion of the impact absorbing member 4 located in front of the opening rear edge 14*a* is a second extending portion 48. The second extending portion 48 extends in the front-rear direction while protruding forward with respect to the floor pan 13. The first extending portion 47 and the second extending portion 48 are integrally formed with each other. Therefore, with the impact absorbing member 4 attached to the floor pan 13, a front end portion 38 of the impact absorbing member 4 is located in front of the opening rear edge 14*a*.

As shown in FIG. 3, the impact absorbing member 4 has a main body portion 30 and a partitioning portion 31.

The main body portion 30 is formed in a shape of a hollow pipe. The main body portion 30 extends in the front-rear direction. The main body portion 30 is formed in a shape of a rectangular frame in which a length dimension in the vehicle width direction is longer than a height dimension in the vertical direction when viewed in the front-rear direction.

The partitioning portion 31 is provided inside the main body portion 30. The partitioning portion 31 extends vertically to connect an upper surface and a lower surface of the main body portion 30 and divides a space inside the main body portion 30 into a left portion and a right portion when viewed in the front-rear direction. The main body portion 30 and the partitioning portion 31 are integrally formed by extrusion-molding a metal material such as an aluminum alloy.

The impact absorbing member 4 is fixed to the bracket 5 by a plurality of fixing portions 36 and 37. The plurality of fixing portions have a front fixing portion 36 provided relatively forward and a rear fixing portion 37 provided rearward with respect to the front fixing portion 36. Therefore, the impact absorbing member 4 is fixed to the bracket 5 by at least two fixing portions of the front fixing portion 36 and the rear fixing portion 37 which are separated from each other in the front-rear direction. The front fixing portion 36 and the rear fixing portion 37 are provided in the common single bracket 5. In other words, both the front fixing portion 36 and the rear fixing portion 37 of the bracket 5 are provided in one member.

Specifically, a plurality of bolt fastening holes (not shown) are formed in the upper surface of the main body portion 30 of the impact absorbing member 4. The bolt fastening hole penetrates the upper surface of the main body portion 30 in the vertical direction. The bolt fastening hole is provided at a position overlapping a bolt fastened hole 52a formed through the horizontal portion 52 of the bracket 5 when viewed in the vertical direction. Therefore, when a bolt is inserted into the bolt fastening hole of the impact absorbing member 4 and the bolt fastening holes 52a of the bracket 5, the bracket and the impact absorbing member 4 are fastened and fixed to each other.

The lower surface of the main body portion 30 of the impact absorbing member 4 is provided with a plurality of (the same number as the number of the bolt fastening holes) bolt inserting holes 35. The bolt inserting hole 35 penetrates the lower surface of the main body portion 30 in the vertical direction. The bolt inserting holes 35 is provided at a position overlapping the bolt fastening hole formed on the upper surface when seen in the vertical direction. A tool or the like for fastening the bolt can be inserted through the bolt inserting hole 35.

As shown in FIGS. 2, 3, and 6, a side surface of the main body portion 30 of the impact absorbing member 4 is provided with a plurality of fragile portions 33. The fragile portions 33 are provided in the second extending portion 48 of the impact absorbing member 4. Each of the fragile portions 33 is a hole that penetrates the side surface or the corner portion of the main body portion 30 in a thickness direction of the main body portion 30. In the present embodiment, the fragile portions 33 are provided at positions corresponding to the four corner portions and are formed in a rectangular shape when viewed in the vertical direction and the vehicle width direction, and a plurality of the fragile portions are provided side by side in the front-rear direction.

As shown in FIGS. 1 and 2, in a state where the impact absorbing member 4 is attached to the floor panel 2 via the bracket 5 (an attachment state of the impact absorbing member 4), the front end portion 38 of the impact absorbing member 4 is disposed to be at the same height as the subframe 3 in the vertical direction. In the attachment state of the impact absorbing member 4, the front end portion 38 of the impact absorbing member 4 faces the contacted surface 22 of the subframe 3. In the attachment state of the impact absorbing member 4, the front end portion 38 of the impact absorbing member 4 is disposed with a spacing S from the contacted surface 22 of the subframe 3 in the front-rear direction.

As shown in FIG. 2, in the attachment state of the impact absorbing member 4, the front end portion 38 of the impact absorbing member 4 is inclined to be parallel to the contacted surface 22 when seen in the vertical direction. Specifically, the front end portion 38 of the left impact absorbing member 4 is inclined to be located from the front to the rear as it goes from the inside (the central portion) to the outside (the left side) in the vehicle width direction such that the front end portion 38 is parallel to the first inclined surface 24 of the subframe 3. The front end portion 38 of the right impact absorbing member 4 is inclined to be located from the front to the rear as it goes from the inside (the central portion) to the outside (the right side) in the vehicle width direction such that the front end portion 38 is parallel to the second inclined surface 25 of the subframe 3.

(Extension Member)

As shown in FIGS. 3 to 6, the extension member 6 is provided behind the impact absorbing member 4. The extension member 6 is provided to face a rear end portion 39 (see FIG. 6) of the impact absorbing member 4. The extension member 6 is provided between the impact absorbing member 4 and a contact object 70 (see FIG. 6) located behind the impact absorbing member 4 in the front-rear direction. The contact object 70 is located behind the vehicle body 11, for example. The extension member 6 extends above the impact absorbing member 4 in the vertical direction. As shown in FIG. 5, the extension member 6 has a vertical wall portion 44 and an attachment flange 45.

The vertical wall portion 44 is a main body portion of the extension member 6 and is disposed at a position facing the rear end portion 39 of the impact absorbing member 4. The vertical wall portion 44 is formed in a plate shape having the front-rear direction as a thickness direction. As shown in FIG. 6, in the present embodiment, a height dimension H1 of the vertical wall portion 44 is greater than a height dimension H2 of the impact absorbing member 4. The upper end portion of the vertical wall portion 44 is located above the upper surface of the impact absorbing member 4. The lower end portion of the vertical wall portion 44 is located below the lower surface of the impact absorbing member 4. As shown in FIG. 5, the rear flange 53 of the bracket 5 is in contact with the vertical wall portion 44 from the front. The vertical wall portion 44 and the rear flange 53 of the bracket 5 are joined to each other by welding or the like.

As shown in FIGS. 3 and 5, the attachment flange 45 extends from the upper end portion of the vertical wall portion 44 toward the impact absorbing member 4 (the front). The lower surface 13a of the floor pan 13 is in contact with the attachment flange 45 from above. The attachment flange 45 and the lower surface 13a of the floor pan 13 are joined to each other by welding or the like.

Therefore, the extension member 6 is fixed to the bracket 5 in the front-rear direction at the vertical wall portion 44 and is fixed to the floor pan 13 in the vertical direction at the attachment flange 45. Regarding the connection between the extension member 6 and the bracket 5 or the floor pan 13, they may be fixed to each other by a bolt or the like instead of welding.

(Reinforcing Member)

Figure 7:
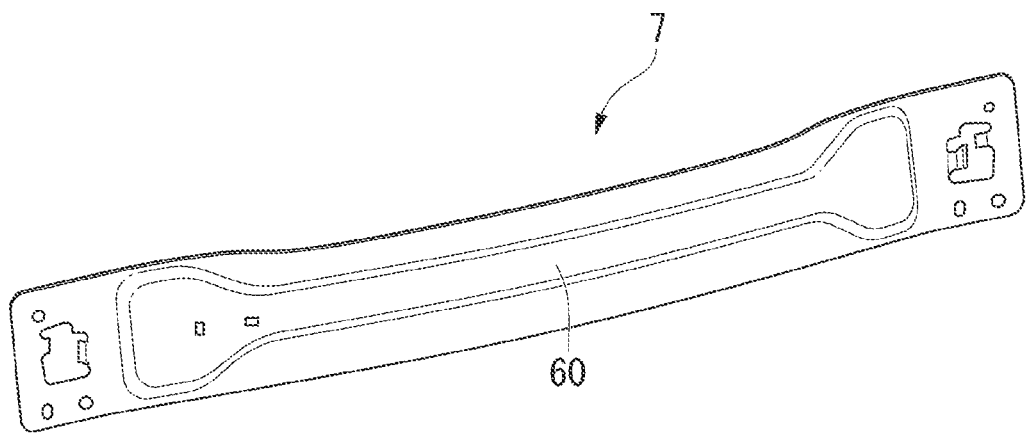
FIG. 7 is a perspective view of a reinforcing member according to the embodiment.
Figure 8:
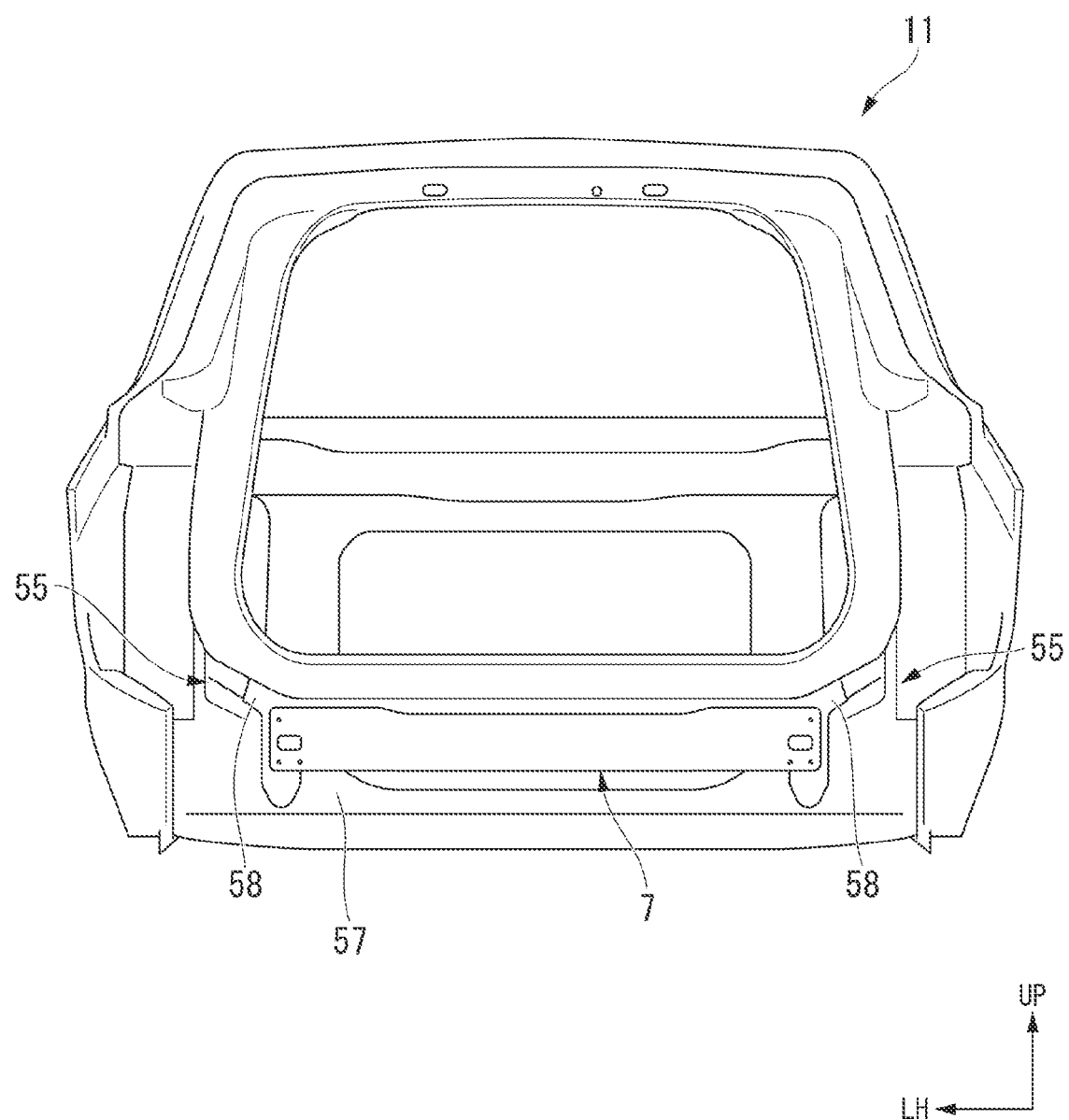
FIG. 8 is a side view of a vehicle body rear portion showing an attachment aspect of the reinforcing member according to the embodiment.

FIG. 7 is a perspective view of the reinforcing member 7 according to the embodiment. FIG. 8 is a side view of a vehicle body rear portion showing an attachment aspect of the reinforcing member 7 according to the embodiment.

As shown in FIG. 8, the reinforcing member 7 is provided to connect a pair of rear frames 55 to each other at the rear portion of the vehicle body 11.

As shown in FIGS. 1 and 8, the pair of rear frames 55 are provided on left and right sides. The rear frames 55 are provided on both left and right sides in the vehicle width direction at the lower portion of the vehicle body rear portion and extend from the rear end portions of the side sills 8 toward the rear of the vehicle.

As shown in FIG. 8, the rear bumper beam 57 is disposed behind the rear frame 55 and spaced above the rear end portion of a rear floor (not shown). The rear bumper beam 57 spans a portion between the rear end portion of the left rear frame 55 and the rear end portion of the right rear frame 55, for example. The rear panel 58 is provided behind the rear bumper beam 57. The rear panel 58 is a highly rigid member formed in a hollow closed cross section together with the rear bumper beam 57.

As shown in FIG. 8, the reinforcing member 7 connects the pair of rear frames 55 to each other behind the rear bumper beam 57. The reinforcing member 7 extends in the horizontal direction of the vehicle body 11 in a state where it is attached to the vehicle body 11. The reinforcing member 7 is fixed to the rear bumper beam 57 by being fastened together with the rear bumper beam 57 at both end portions thereof.

As shown in FIG. 7, the reinforcing member 7 has a bead 60 extending in a horizontal direction. The bead 60 is provided over substantially the entire length of the reinforcing member 7 in a longitudinal direction thereof (the vehicle width direction).

(Method of Absorbing Impact Load in Vehicle Body Rear Structure)

Next, in the above-mentioned vehicle body rear structure 1, a method of absorbing the impact load in a case where an impact load is input from the rear of the vehicle body 11 having the vehicle body rear structure 1 (at the time of a rear collision) will be described.

First, immediately after the load is input to the impact absorbing member 4 (in an initial stage of the rear collision), the impact absorbing member 4 is in non-contact with the subframe 3. After that, as the load input to the impact absorbing member 4 increases, the impact absorbing member 4 moves forward, and the impact absorbing member 4 comes into contact with the contacted surface 22 of the subframe 3. When the load further increases in this state (in a middle stage of the rear collision), the impact load is transmitted to the subframe 3 while the front portion of the impact absorbing member 4 having the fragile portion 33 is collapsed. As a result, the impact load is absorbed in the middle stage of the rear collision.

Further, when the load is input to the subframe 3 (in a later stage of the rear collision), the impact load is absorbed in an easily crushed region of the front end portion of the subframe 3. At this time, since the rear portion of the impact absorbing member 4 is maintained at high rigidity, the load is reliably transmitted from the impact absorbing member 4 to the subframe 3, and the impact load is absorbed.

On the other hand, behind the impact absorbing member 4, the impact absorbing member 4 is pushed by the subframe 3 to move or deform rearward, and thus the impact absorbing member 4 and the extension member 6 come into contact with each other. As the movement and deformation progress further, the rear end portion 39 of the impact absorbing member 4 comes into contact with the rear contact object 70 via the extension member 6. When the impact absorbing member 4 comes into contact with the contact object 70, the input impact load is absorbed by the impact absorbing member 4. At this time, since the extension member 6 is provided behind the impact absorbing member 4, even in a case where the impact absorbing member 4 is deviated in the vertical direction due to a rear collision, it is possible to transmit the load by reliably bringing the rear end portion 39 of the impact absorbing member 4 into contact with the contact object 70 via the extension member 6.

The reinforcing member 7 is provided behind the impact absorbing member 4 in the front-rear direction and slightly above the impact absorbing member 4 in the vertical direction. The reinforcing member 7 curbs breakage of the rear bumper beam 57 at the time of a rear collision and promotes deformation of the rear frame, thereby absorbing the impact load together with the impact absorbing member 4 and further improving an impact absorbing effect.

Operations and Effects

Next, operations and effects of the vehicle body rear structure 1 described above will be described.

According to the vehicle body rear structure 1 of the present embodiment, the impact absorbing member 4 is detachably attached to the lower surface 13a of the floor pan 13 located at the rear portion of the floor panel 2 via the bracket 5. The impact absorbing member 4 has the first extending portion 47 along the floor panel 2 (the floor pan 13) and the second extending portion 48 that extends forward with respect to the floor pan 13. As a result, the front end portion 38 of the impact absorbing member 4 can be disposed in front of the floor pan 13. Therefore, for example, even in a case where the fuel tank 16 or the like is disposed below the floor panel 2, the impact absorbing member 4 can be extended forward to a desired position in the front-rear direction.

The subframe 3 is disposed in front of the impact absorbing member 4. The front end portion 38 of the impact absorbing member 4 is disposed to be at the same height as the subframe 3 in the vertical direction and is disposed with the spacing from the subframe 3 in the front-rear direction. As a result, even in a case where the floor panel 2 has the opening 14 on the lower surface thereof, it is possible to dispose the subframe 3 and the front end portion 38 of the impact absorbing member 4 close to each other as compared with the related art in which the impact absorbing member 4 is disposed along the floor panel 2. Therefore, it is possible to prevent the impact absorbing member 4 from becoming idle at the time of a rear collision and effectively absorb the impact load at the time of a rear collision.

Since the impact absorbing member 4 is brought into contact with the subframe 3, it is possible to prevent the height positions of the impact absorbing member 4 and the subframe 3 from deviating from each other during a rear collision. That is, as compared with the related art in which the impact absorbing member 4 is brought into contact with a torsion beam which is easily displaced in the vertical direction with respect to the vehicle body 11 due to a relationship with a suspension, the subframe 3 is fixed to the vehicle body 11, and thus a deviation in a relative position between the impact absorbing member 4 also attached to the vehicle body 11 and the subframe 3 is less likely to occur. As a result, the impact absorbing member 4 and the subframe 3 can be reliably brought into contact with each other at the time of a rear collision.

Furthermore, the extension member 6 is provided to face the rear end portion 39 of the impact absorbing member 4. As a result, for example, in a case where the contact object 70 is positioned behind the impact absorbing member 4, it is possible to bring the impact absorbing member 4 and the contact object 70 into contact with each other via the extension member 6. At this time, since the extension member 6 extends above the impact absorbing member 4, the amount of overlap (the lap amount) between the extension member 6 and the contact object 70 in the vertical direction increases. As a result, regardless of the vertical position of the contact object 70, it is possible to transmit the load to the impact absorbing member 4 and to absorb the impact. Therefore, it is possible to enhance an impact absorbing effect of the impact absorbing member 4 and the contact object 70.

Therefore, it is possible to provide the vehicle body rear structure 1 that can further improve the impact absorbing effect of the impact absorbing member 4 and further improve the safety of the occupant.

The extension member 6 is fixed to the bracket 5 and the floor pan 13 in the front-rear direction and the vertical direction, respectively. Since the extension member 6 is fixed to two members in two directions, it is possible to increase the fixing strength of the extension member 6. Therefore, it is possible to stably secure the lap amount between the impact absorbing member 4 and the contact object 70 in the vertical direction. The extension member 6 is not fixed to the impact absorbing member 4. For this reason, there is no need to form a flange or the like for attaching the extension member 6 to the impact absorbing member 4, and it is possible to form the impact absorbing member 4 through extrusion molding. Furthermore, since the extension member 6 and the impact absorbing member 4 are not directly fixed to each other, it is possible to effectively transmit the impact load without being affected by the deformation of the impact absorbing member 4 at the time of a rear collision.

The impact absorbing member 4 is fixed to the bracket 5 at at least two positions of the front fixing portion 36 and the rear fixing portion 37, and the front fixing portion 36 and the rear fixing portion 37 are provided for one bracket 5. Since the lower surface 13a of the floor pan 13 is reinforced by the firmly fixed bracket 5, the rigidity of the floor pan 13 increases. As a result, the attachment strength of the impact absorbing member 4 is also improved. Therefore, when the load is transmitted to the extension member 6, it is possible to reliably transmit the impact load to the impact absorbing member 4.

The reinforcing member 7 is provided to connect the pair of rear frames 55 to each other behind the rear bumper beam 57 and is fastened together with the rear bumper beam 57. As a result, it is possible to curb the breakage of the rear bumper beam 57 at the time of a rear collision, and it is possible to transmit the impact load between the rear frames 55. Therefore, it is possible to further improve the impact absorption effect of the vehicle as a whole, and it is possible to further improve the safety of the occupant.

The reinforcing member 7 extends in the horizontal direction of the vehicle body 11 and has the bead 60 extending in the horizontal direction. By forming the bead 60, it is possible to improve the strength of the reinforcing member 7, which is elongated in the horizontal direction (that is, the vehicle width direction), and it is possible to curb the generation of distortion during manufacturing of the reinforcing member 7, for example. Since both the reinforcing member 7 and the bead 60 extend in the horizontal direction, it is possible to curb stress concentration compared to the case where the reinforcing member 7 and the bead 60 are curved in the vertical direction, such as in a U shape when viewed in the front-rear direction. Therefore, it is possible to curb the deformation and breakage of the reinforcing member 7, and it is possible to enhance the efficiency of transmitting the impact load between the rear frames 55 at the time of a rear collision. Therefore, it is possible to further improve the impact absorption effect of the vehicle as a whole, and it is possible to further improve the safety of the occupant.

The technical scope of the present invention is not limited to the above-described embodiments, and various modifications can be made without departing from the spirit of the present invention.

For example, in the above-described embodiment, the upper end portion of the vertical wall portion 44 is positioned above the upper surface of the impact absorbing member 4 and the lower end portion of the vertical wall portion 44 is positioned below the lower surface of the impact absorbing member 4, but the present invention is not limited to this. At least a part of the vertical wall portion 44 only has to extend upward with respect to the impact absorbing member 4, and for example, the lower end portion of the vertical wall portion 44 may be positioned at the same height as the lower surface of the impact absorbing member 4.

Although the bracket 5 straddling the opening rear edge 14a is formed in an L shape in the above-described embodiment, the shape of the bracket 5 is not limited to the L shape.

The contacted surface 22 may be formed by joining a plate-shaped member to the rear end portion of the rear beam 19. That is, the rear beam 19 and the contacted surface 22 may be formed with separate members.

A spacer or the like may be provided between the bracket 5 and the impact absorbing member 4.

The subframe 3 only has to be fixed to the vehicle body frame 10, and the present invention is not limited to the configuration in which the pair of arms 17 are attached to the side sills 8. The arms 17 of the subframe 3 may be connected to the cross member 9.

The cross-sectional shape of the impact absorbing member 4 and the shape of the holes in the fragile portion 33 are not limited to the shapes of the above-described embodiments. As the fragile portion 33, a slit, a notch, a bead extending in a direction orthogonal to the load transmission direction, an unevenness, or the like may be provided instead of the hole.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 Vehicle body rear structure
2 Floor panel

3 Subframe
4 Impact absorbing member
Bracket
6 Extension member
7 Reinforcing member
11 Vehicle body
13 Floor pan
13a Lower surface
36 Front fixing portion
37 Rear fixing portion
38 Front end portion (of impact absorbing member)
39 Rear end portion (of impact absorbing member)
47 First extending portion
48 Second extending portion
55 Rear frame
57 Rear bumper beam
60 Bead
S Spacing

What is claimed is:

1. A vehicle body rear structure comprising:
a floor panel;
a subframe which is provided below the floor panel in a vertical direction of a vehicle body;
an impact absorbing member which is provided behind the subframe in a front-rear direction of the vehicle body and extends in the front-rear direction;
a bracket which detachably attaches the impact absorbing member to a lower surface of the floor panel; and
an extension member which is provided to face a rear end portion of the impact absorbing member,
wherein the floor panel has a floor pan having the lower surface to which the impact absorbing member is attached,
wherein the impact absorbing member has
a first extending portion which is provided along the lower surface of the floor pan, and
a second extending portion which is integrally formed with the first extending portion and extends forward with respect to the floor pan in the front-rear direction,
wherein a front end portion of the impact absorbing member is disposed to be at the same height as the subframe in the vertical direction and is disposed with a spacing from the subframe in the front-rear direction, and
wherein the extension member extends above the impact absorbing member in the vertical direction.

2. The vehicle body rear structure according to claim 1, wherein the extension member is fixed to the bracket in the front-rear direction and is fixed to the floor pan in the vertical direction.

3. The vehicle body rear structure according to claim 1,
wherein the impact absorbing member is fixed to the bracket by at least two fixing portions of a front fixing portion provided relatively forward and a rear fixing portion provided rearward with respect to the front fixing portion, and
wherein the front fixing portion and the rear fixing portion are provided in the single bracket.

4. The vehicle body rear structure according to claim 2,
wherein the impact absorbing member is fixed to the bracket by at least two fixing portions of a front fixing portion provided relatively forward and a rear fixing portion provided rearward with respect to the front fixing portion, and
wherein the front fixing portion and the rear fixing portion are provided in the single bracket.

5. The vehicle body rear structure according to claim 1, further comprising:
a pair of left and right rear frames;
a rear bumper beam; and
a reinforcing member which is provided to connect the pair of rear frames to each other behind the rear bumper beam,
wherein the reinforcing member is fixed to the rear bumper beam by being fastened together with the rear bumper beam.

6. The vehicle body rear structure according to claim 2, further comprising:
a pair of left and right rear frames;
a rear bumper beam; and
a reinforcing member which is provided to connect the pair of rear frames to each other behind the rear bumper beam,
wherein the reinforcing member is fixed to the rear bumper beam by being fastened together with the rear bumper beam.

7. The vehicle body rear structure according to claim 5, wherein the reinforcing member extends in a horizontal direction of the vehicle body in a state where it is attached to the vehicle body and has a bead extending in the horizontal direction.

8. The vehicle body rear structure according to claim 6, wherein the reinforcing member extends in a horizontal direction of the vehicle body in a state where it is attached to the vehicle body and has a bead extending in the horizontal direction.

* * * * *